March 13, 1973 J. W. JACOBS 3,720,372
MEANS FOR RAPIDLY HEATING INTERIOR OF A MOTOR VEHICLE
Filed Dec. 9, 1971
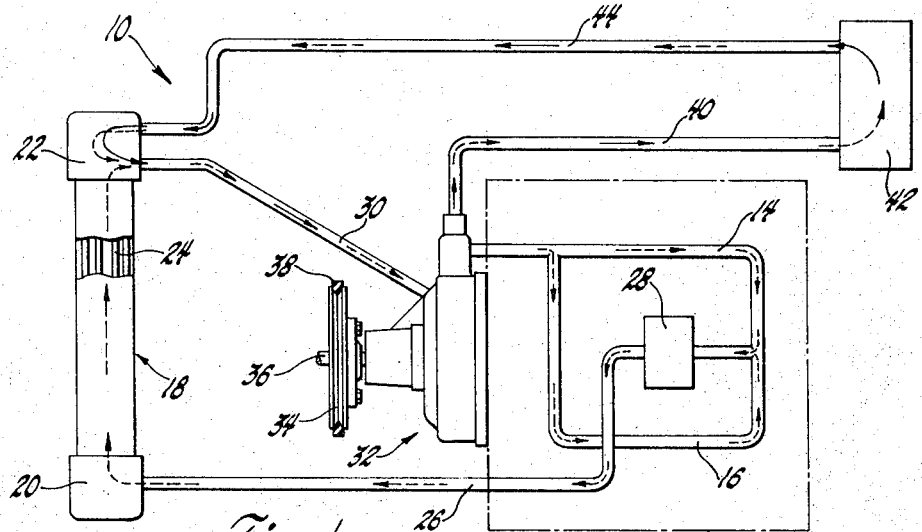
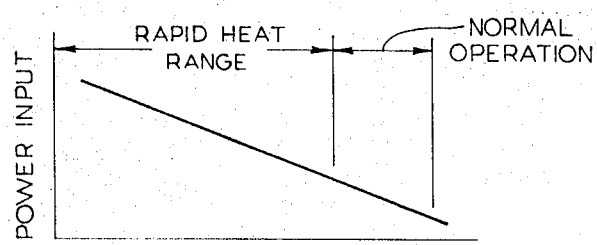
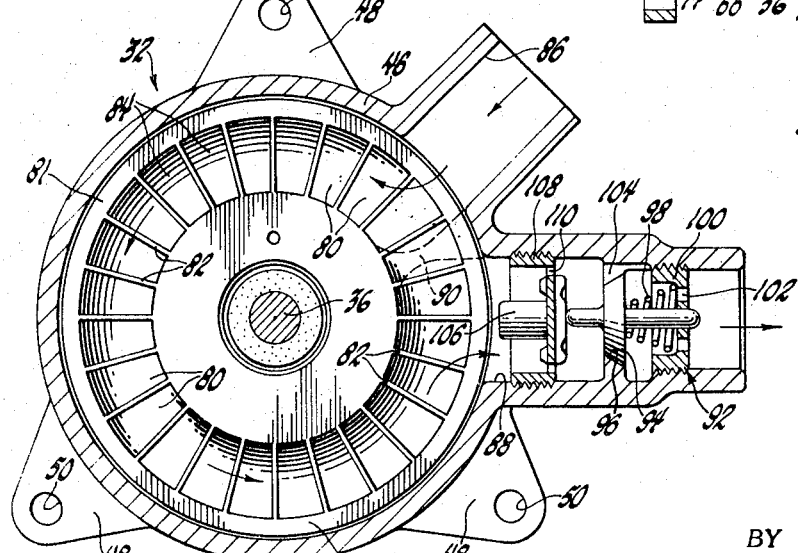
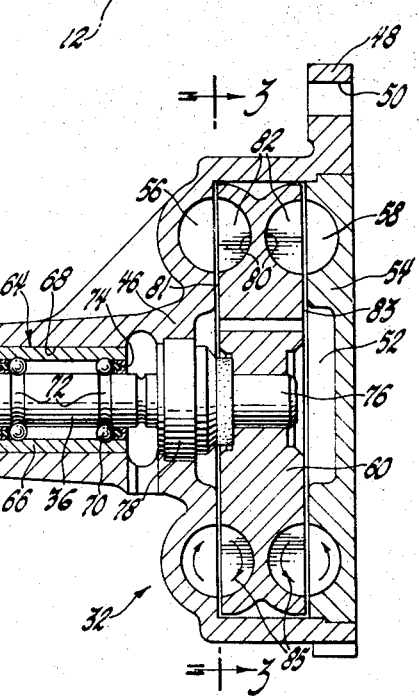
INVENTOR.
James W. Jacobs
BY
K. H. MacLean, Jr.
ATTORNEY

United States Patent Office

3,720,372
Patented Mar. 13, 1973

3,720,372
MEANS FOR RAPIDLY HEATING INTERIOR OF A MOTOR VEHICLE
James W. Jacobs, Dayton, Ohio, assignor to General Motors Corporation, Detroit, Mich.
Filed Dec. 9, 1971, Ser. No. 206,333
Int. Cl. B60h 1/02
U.S. Cl. 237—12.3 B 3 Claims

ABSTRACT OF THE DISCLOSURE

A heating system for an automobile passenger compartment which includes a turbine type coolant pump driven by the automobile engine to warm engine coolant and pump it through a heater in the passenger compartment. The turbine pump has a housing which defines an annular fluid passage between the pump inlet and pump outlet. Turbine buckets formed along the peripheral edge of a rotatable impeller within the pump housing move through the annular channel to heat coolant therein by means of impact of the turbine buckets upon the coolant.

---

This invention relates to a rapid starting heating system for automobile passenger compartment.

Conventional passenger compartment heating systems utilize engine coolant which is warmed by passage through water jackets of an internal combustion engine. Large internal combustion engines used in automobiles require a relatively long period of time to achieve a temperature useful for warming the heater core within a passenger compartment. The warmup period increases as the ambient temperature decreases and therefore in winter when rapid heating of the passenger compartment is most desirable, the engine warmup and consequential heating of the passenger compartment is delayed.

The present quick starting heating system for the automobile passenger compartment eliminates the delay corresponding to the engine warmup of the automobile. The engine turns a turbine type pump assembly which is fluidly connected to the engine coolant system and a heater core in the passenger compartment. The turbine pump includes an impeller having many turbine buckets on its peripheral edge which is rotatable within an annular coolant passage formed in the pump housing. The multiple impact of turbine buckets upon coolant within the annular passage as it passes through the pump imparts heat energy to the coolant immediately after the automobile engine is started. Heat is thus available for warming the heater core in the passenger compartment long before the engine itself reaches normal operating temperature.

The turbine pump may be used alone or in combination with a conventional centrifugal type water pump which is presently used in automobile engines. Unlike a centrifugal type pump whose capacity is increased as the power input increases, a turbine pump requires maximum power input at low flow capacity and the power input decreases as the capacity increases. Thus, when the outlet of a turbine pump is restricted by a regulating valve, a relatively great amount of horse power is used to rotate the impeller of the turbine pump and increase the temperature of the coolant therein by doing work upon the fluid. This provides rapid heating of the coolant for warming the passenger compartment heater core. However, once the engine is sufficiently warm, the power input of the turbine pump drops significantly as the regulator valve is opened and the pumping capacity increases.

Therefore, an object of the present invention is to provide a rapid starting heater for an automobile passenger compartment utilizing a turbine type coolant pump turned by the automobile's engine and having a coolant temperature responsive regulator valve which controls coolant flow through the turbine pump to produce and pass warm coolant through a heater core in the passenger compartment.

A further object of the present invention is to provide a rapid starting heater for a passenger compartment of an automobile including a turbine coolant pump with a housing which forms a circular flow passage through which turbine buckets on the peripheral edge of an impeller are rotated for heating the coolant for subsequent transmission to a heater core in the passenger compartment.

A still further object of the present invention is to provide a combination rapid starting heater for an automobile passenger compartment and coolant pump for cooling an engine including a turbine type pump whose outlet is controlled by a temperature and pressure responsive regulator valve to cause the turbine pump to rapidly heat the coolant to a predetermined temperature and circulate the coolant through a heater core in the passenger compartment.

Further objects and advantages of the present invention will be more readily apparent from the following detailed description, reference being had to the accompanying drawings in which a preferred embodiment of the invention is clearly shown.

In the drawings:
FIG. 1 is a schematic view of the engine compartment of an automobile with a passenger compartment heater;
FIG. 2 is a sectioned view of the pump along section line 2—2 in FIG. 3 and looking in the direction of the arrows;
FIG. 3 is a sectioned view of the pump along section line 3—3 in FIG. 2 looking in the direction of the arrows; and
FIG. 4 shows the pump's operational characteristics.

In FIG. 1 of the drawings, an engine compartment 10 is shown including an internal combustion engine 12 having water jackets or passages 14 and 16 on the right-hand and left-hand banks of the engine respectively. A radiator 18 including an inlet header tank 20, an outlet header tank 22 and connecting tubes 24 is positioned on the front of the engine compartment 10. It is adapted to conduct a flow of ambient air between the tubes 24. The inlet header tank 20 of radiator 18 is fluidly connected by a hose 26 to a thermostat valve 28.

The thermostat 28 has an inlet which is fluidly connected to water jackets 14 and 16. Thermostat 28 is closed at temperatures less than the engine's designed operating temperature to prevent the circulation of coolant within water jackets 14 and 16 to radiator 18. This shortens the warmup time of the engine. When the temperature of coolant in the engine water jackets 14 and 16 reaches a predetermined level, the thermostat 28 opens to pass coolant from the engine, through hose 26 and into the inlet header 20 of radiator 18. A hose 30 which connects the outlet header tank 22 of radiator 18 passes coolant to a turbine pump assembly 32 supported on the front of engine 12.

The turbine pump assembly 32 draws coolant from the radiator 18, pressurizes it and pumps it back into the water jackets 14 and 16. A pulley 34 on the end of pump shaft 36 is turned by a V-belt 38 which engages a pulley on the engine's crankshaft (not visible in FIG. 1). Rotation of the engine 12 powers the turbine pump assembly 32 by rotating pulley 34 and shaft 36.

A turbine or regenerative pump is a special type of centrifugal pump. A centrifugal pump introduces fluid at or near the center of the impeller. The fluid then flows between impeller vanes and is thrown outward by the action of centrifugal force into a volute channel to be discharged from the pump. A turbine type pump however, introduces fluid to a channel enclosing vanes formed on each side of the impeller periphery. The moving vanes act against the fluid in the channel to cause a complete revolution of the fluid which is then diverted out the discharge by a partition or wall between the pump inlet and outlet openings.

Fluid in a centrifugal pump can pass between the impeller vanes but once and energy is supplied to it only while traveling the short distance from the inner to the outer periphery of the impeller. In the turbine pump, the fluid is recirculated between the vanes and the channel. Energy is supplied to the fluid by a number of impacts or impulses of the impeller vanes on the fluid. When the discharge is restricted, the number of impacts is increased. This increases the work done on the fluid and causes an increase in its temperature.

The turbine pump 32 is adapted to pump coolant through a conduit or hose 40 to a heater core 42 within the passenger compartment of the automobile. Another conduit or hose 44 carries coolant from the heater core 42 back to the outlet heater 22 of radiator 18.

Details of the turbine pump assembly 32 are best shown in FIGS. 2 and 3 which illustrate a housing 46 having flange portions 48 to secure the pump assembly to the front of the engine 12. Bores 50 in the flanges 48 are adapted to receive fasteners for this purpose. Housing 46 encloses a generally cylindrical interior 52 enclosed at one end by an end cover 54. Annular fluid channels 56 and 58 are formed in housing 46 and end cover 54 respectively. A cylindrical impeller 60 is adapted to be rotated within the interior 52 by shaft 36 supported by housing 46.

The shaft 62 is supported for rotation by a bearing 64 including a sleeve 66 within bore 68. Ball bearings 70 are axially retained by grooves 72 in the shaft and oil and grease retainers 74. The impeller 60 is pressed onto the end 76 of shaft 36 and may utilize other suitable securing means. A seal assembly 78 around shaft 76 prevents the leakage of coolant from the interior 52 of the pump 32.

The peripheral edge of the impeller 60 rotates between the annular channels 56 and 58. As best shown in FIG. 3, semicircular cut outs or depressions 80 are formed in both faces 81, 83 of the impeller 60 adjacent the annular channels 56 and 58. These depressions 80 are angularly spaced about the outer edge of the impeller 60 and are separated by radial extending walls 82. They form individual turbine buckets 84 on either side of the impeller 60 adjacent the channels 56 and 58. As the impeller 60 is rotated in interior 52 of the housing 46, coolant in the channels 56 and 58 swirls in circular eddy paths 85 as it also flows through the channels 56 and 58. The eddy currents are caused by the multiple impacts of the turbine buckets on coolant in the interior 52.

A coolant inlet 86 in the housing 46 transmits coolant to the channels 56 and 58 where the walls 82 of the turbine buckets 84 impinge upon coolant. This causes it to flow around the housing in channels 56 and 58 to an outlet 88 in housing 46. A divider wall portion 90 extends across the channels 56 and 58 between the inlet 86 and outlet 88 to divert coolant flow from the channels 56 and 58 and into the outlet 88.

A temperature and pressure responsive regulating valve 92 within outlet 88 controls the flow of coolant from the pump 32. More specifically, a poppet type valve member 94 is adapted to engage a valve seat 96 within the outlet 88. A compression spring 98 between the valve member 94 and a collar 100 normally maintains the valve member 94 in a closed position. Ports 102 in collar permit fluid flow through the collar. When pressure caused by rotation of impeller 60 exceeds a predetermined level, the valve member 94 is moved against the spring 98 away valve seat 96 to increase coolant flow and to lessen the pressure within the pump assembly. A bypass opening 104 provides a minimum coolant flow to bypass the valve member 94. An expansible material pellet type element 106 is supported by a collar 108 adjacent valve member 94. When the temperature of coolant within the pump assembly 32 reaches a predetermined level, the element 106 engages the valve member 94 and moves it from seat 96 to increase fluid flow discharged from the pump assembly. Ports 110 in the collar 108 permit fluid flow around the element 106.

When the automobile engine 12 is first started on a cold day, the volume of coolant flow from the turbine pump assembly 32 is relatively small because element 106 senses a relatively low temperature within the pump assembly and therefore maintains valve member 94 in a closed position. The multiple impact of walls 82 of the turbine buckets 84 on coolant and vigorous eddy flow occurring under this low discharge condition rapidly heats the coolant corresponding to the work done on the fluid by rotation of the impeller. The increased temperature of coolant causes the expansible material within element 106 to exert a force against the valve member 94 which tends to open the valve and increase the flow of warmed coolant from the pump assembly 32 to heater 42. Because the engine 12 has just been started, thermostat 28 is still closed and therefore the warm coolant is not pumped through the water jackets 14 and 16 of the engine to any great extent. Instead, the warmed coolant passes through hose 40 to the passenger compartment heater 42. This warms the passenger compartment. The coolant then flows from heater 42 through hose 44 and header tank 22 back to the inlet 86 of the turbine pump 32. When the thermostat 28 of engine 12 opens in response to full warmup of the engine, coolant is passed both through the engine and through the heater 42. During normal operation, the relatively warm coolant passing through the pump assembly 32 maintains the valve 94 open for providing a relatively large flow through the system.

FIG. 4 shows the operational characteristics of the rapid heater system during initial heating of the passenger compartment right after startup on a cool day and during full temperature operation of the automobile after the engine is up to temperature. A turbine type pump unlike conventionally used centrifugal pumps requires relatively large power inputs at low pumping capacities or flow rates. This corresponds to operation with valve 94 in a closed or nearly closed position which occurs when the engine 12 is cool. During this period, a maximum amount of heating is done upon coolant by the pump 32.

As the engine 12 approaches its operating temperature, the thermostat 28 begins to open and increases the coolant temperature in the pump. The warmer coolant temperatures causes valve 94 to be open and thus less work is done by the pump on coolant. The power input to the turbine pump 32 decreases. After the engine 12 is up to its operating temperature, the power input to the pump corresponding to the amount of work or heating of the coolant therein is decreased greatly from the level prevailing when the engine was first started. This is desirable because with the engine 12 at operating temperature, the motor waste heat transferred to the coolant can be economically used to warm the heater 42 and the decreased power input of the turbine pump under the conditions provides added power for moving the automobile.

While the embodiment described and illustrated in the drawings is the preferred embodiment, other embodiments may be adapted. Specifically, a bypass around the pump could replace the present flow regulating valve in the outlet.

What is claimed is as follows:

1. A rapid starting heater for warming a passenger compartment of an automobile having an engine with a liquid type cooling system comprising: a heater in said passenger compartment with an inlet and an outlet which are connected by fluid passages; a radiator in the front of the automobile with inlet and outlet header tanks fluidly connected by a plurality of tubes for passing engine coolant therebetween; said inlet header tank fluidly connected to coolant passages in said engine for receiving coolant therefrom; thermally responsive valve means between said engine coolant passages and said inlet header tank for blocking the flow of coolant from said engine until a predetermined coolant temperature; means fluidly connecting the outlet of said heater to said outlet header tank; a pump assembly having an inlet fluidly connected to said outlet header tank and an outlet fluidly connected to both said heater inlet and said engine passages; said pump having a housing enclosing a circular channel between said pump inlet and said pump outlet; an impeller rotated within said pump housing by said engine and having a plurality of turbine buckets formed along its peripheral edge which are movable through said circular channel as said impeller rotates for passing coolant between said inlet and said outlet and for heating said coolant in said annular channel by the impact of said moving buckets upon the coolant; means including a valve supported in said pump outlet operative in response to coolant temperature in said pump for regulating coolant flow from said pump whereby upon first starting said engine the coolant in said pump is rapidly increased in temperature by the work of said impeller and its buckets on said coolant to produce rapid warming of said passenger compartment heater.

2. A rapid starting heater for warming a passenger compartment of an automobile having an engine with a liquid type cooling system comprising: a heater in said passenger compartment with an inlet and an outlet which are connected by fluid passages; a radiator in the front of the automobile with inlet and outlet header tanks fluidly connected by a plurality of tubes for passing engine coolant therethrough which is cooled by passing air around the tubes; said inlet header tank fluidly connected to coolant passages in said engine for receiving coolant therefrom; thermally responsive valve means between said engine coolant passages and said inlet header tank for blocking the flow of coolant from said engine until a predetermined temperature; a turbine type pump assembly having an inlet which is fluidly connected to said outlet header tank and an outlet which is fluidly connected to both said heater core inlet and said engine passages for pumping coolant therethrough; said pump having a housing enclosing a circular channel between said pump inlet and said pump outlet; an impeller rotated within said pump housing by said engine and having a plurality of turbine buckets formed along its peripheral edge which are movable through said circular channel as said impeller rotates for passing coolant between said inlet and said outlet and for heating said coolant in said annular channel by the impact of said moving turbine buckets upon the coolant; a flow regulating valve in said pump outlet responsive to increasing coolant temperature and pressure to open for controlling the coolant pressure and temperature in said pump whereby upon first starting said engine, the regulator valve limits coolant discharge therefrom and causes a rapid increase in coolant temperature which causes warm coolant to pass through said heater to warm said passenger compartment.

3. A rapid starting heater for warming a passenger compartment of an automobile having an engine with a liquid type cooling system comprising: a heater in said passenger compartment with an inlet and an outlet which are connected by fluid passages; a radiator in the front of the automobile with inlet and outlet header tanks fluidly connected by a plurality of tubes for passing engine coolant therethrough which is cooled by passing air around the tubes; said inlet header tank fluidly connected to coolant passages in said engine for receiving coolant therefrom; thermally responsive valve means between said engine coolant passages and said inlet header tank for blocking the flow of coolant from said engine until a predetermined temperature; a turbine type pump assembly having an inlet which is fluidly connected to said outlet header tank and an outlet which is fluidly connected to both said heater core inlet and said engine passages for pumping coolant therethrough; said pump assembly having a housing enclosing a circular channel between said pump inlet and said pump outlet; an impeller rotated within said pump housing by said engine and having a plurality of turbine buckets formed along its peripheral edge which are movable through said circular channel as said impeller rotates for passing coolant between said inlet and said outlet; said turbine buckets formed by cut-out portions in the faces of said impeller around its peripheral edge separated by radially directed wall portions which repeatedly impact against coolant in said circular passage and thereby increase its temperature; a flow regulating valve in said pump outlet responsive to increasing coolant temperature and pressure to open for controlling the coolant pressure and temperature in said pump whereby upon first starting said engine, the regulator valve limits coolant discharge therefrom and causes a rapid increase in coolant temperature which causes warm coolant to pass through said heater to warm said passenger compartment.

References Cited
UNITED STATES PATENTS

| | | | |
|---|---|---|---|
| 1,760,402 | 5/1930 | Derrick | 415—213 T |
| 2,748,762 | 6/1956 | Booth | 126—247 |
| 2,748,899 | 6/1956 | Booth et al. | 122—26 X |
| 2,749,049 | 6/1956 | Smith | 237—8 A |
| 3,591,079 | 7/1971 | Peters | 237—12.3 B |

WILLIAM F. O'DEA, Primary Examiner

P. D. FERGUSON, Assistant Examiner

U.S. Cl. X.R.

122—26; 123—41.08, 41.44; 126—247; 165—41; 237—34; 415—53 T, 199 T, 213 T